UNITED STATES PATENT OFFICE.

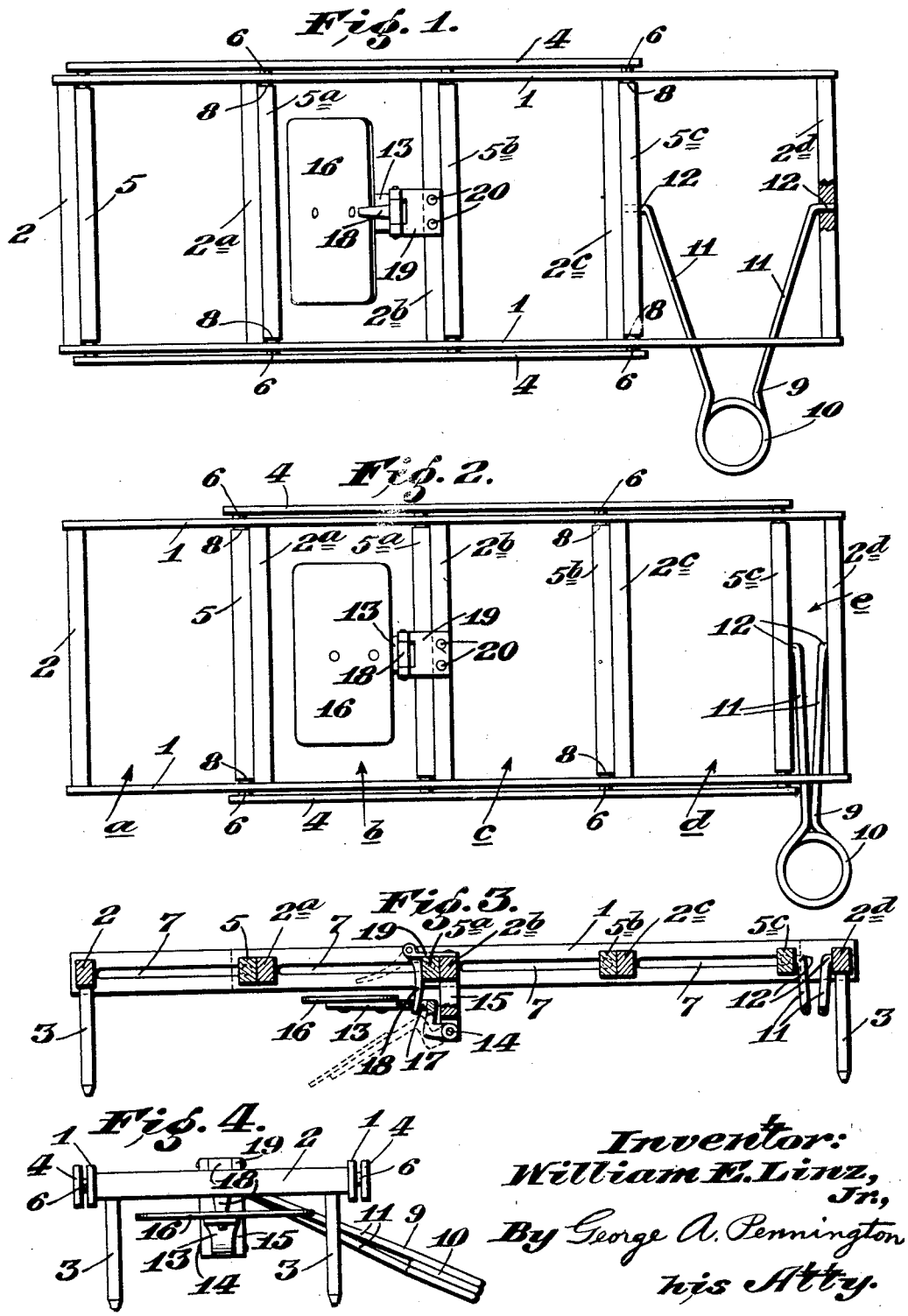

WILLIAM E. LINZ, JR., OF ALLENTON, MISSOURI.

ANIMAL-TRAP.

1,370,327.

Specification of Letters Patent.    Patented Mar. 1, 1921.

Application filed November 3, 1919. Serial No. 335,514.

*To all whom it may concern:*

Be it known that I, WILLIAM E. LINZ, Jr., a citizen of the United States, residing at Allenton, in the county of St. Louis and State of Missouri, have invented a new and useful Improvement in Animal-Traps, of which the following is a specification.

This invention relates to animal traps. It has for its object to produce a novel structure which is simple and easily manufactured and will operate effectively and with more certainty to trap and hold an animal without unduly mutilating it.

The invention consists in the parts and in the combinations and arrangements of parts hereinafter described and claimed.

In the accompanying drawing, illustrating a practical embodiment of the invention,—

Figure 1 is a top plan view of the trap in unset or operated condition;

Fig. 2 is a similar view of the trap as set;

Fig. 3 is a longitudinal vertical section through the trap as shown in Fig. 2; and Fig. 4 is an end view.

Referring now to the drawing, the structure therein shown includes a rigid body or main frame or grille, comprising side-rails 1 and cross-bars 2, $2^a$, $2^b$, $2^c$ and $2^d$, all of which latter are spaced equally distant apart, except the endmost bar $2^d$ which is located somewhat farther apart from its adjacent bar $2^c$ than are the other bars, the reason for which is to accommodate a spring element as will presently more fully appear. This frame is supported at its four corners by legs 3.

Slidable longitudinally on the main frame or grille is a supplemental frame or grille comprising side-rails 4 and cross-bars 5, $5^a$, $5^b$, and $5^c$, the latter being spaced equidistant the same as the bars 2, $2^a$, $2^b$ and $2^c$ of the main frame or grille. As shown, the side-rails 4 are disposed on the outer sides of the side-rails 1, and the cross-bars 5, $5^a$, $5^b$ and $5^c$ have reduced end portions 6 which extend through slots 7 in said side-rails 1 and afford shoulders 8 abutting the inner sides of the rails 1, whereby the supplemental frame is guided when sliding on the main frame.

A spring 9 has its middle portion coiled, as at 10, with its legs 11 spread normally apart and having the extreme end portions thereof turned at an angle, as at 12, and inserted in apertures provided therefor in the adjacent endmost cross-bars $2^d$ and $5^c$, respectively, of the main and supplemental frames. In this way, the spring is constantly under tension and acts to move the supplemental frame toward the other end of the main frame (see Fig. 1), and the relatively wider space between the cross-bars $2^d$ and $5^c$ affords a space $e$ for the accommodation of the spring when the supplemental frame is moved rearward into set position (see Fig. 2).

Mounted on the middle cross-bar $2^b$ of the main frame is a trippable latch or trigger device to engage the second cross-bar $5^a$ from the end of the supplemental frame when the latter is in retracted or set position (see Figs. 2 and 3), and in which position of the parts the same are releasably held in engagement by the tension of the spring 9. As shown, the trigger device comprises a lever 13 which is hinged, as at 14, to the lower end portion of a bracket extension or member 15 depending from the cross-bar $2^b$. This lever is provided at its free end portion with a plate 16 affording ample surface for the contact of the foot or pressure from some other part of the animal thereon, and upon which plate, also, a suitable bait may be attached. At a place between the plate 16 and the pivot 14, the lever is provided with an aperture or slot 17 for the reception of the free end portion of a dog or catch member 18 which is hinged to a plate 19 secured, as at 20, on the cross-bar $2^b$. The plate 19 projects beyond the cross-bar $2^b$ so as to overhang the cross-bar $5^a$ of the supplemental frame when the said cross-bars $5^a$ and $2^b$ are brought together and into engagement with each other as the supplemental frame is moved into set position (see Figs. 2 and 3), and as the spring 9 presses on the supplemental frame, the cross-bar $5^a$ is thereby held against the catch member 18, which latter in turn bears with its end portion against the end of the slot 17 of the lever 13. In this relation of the two frames, open spaces $a$, $b$, $c$, and $d$, are afforded into which the leg or tail of an animal may enter so as to be caught between the respective coöperating cross-bars 2 and 5, $2^a$ and $5^a$, $2^b$ and $5^b$, or $2^c$ and $5^c$, as the case may be, when the trap is sprung and the slidable frame is moved forcibly toward the end of the main frame, as shown in Fig. 1.

To set the trap it is only necessary to slide the supplemental frame rearward on the main frame, thereby compressing the spring 9, and then lift the trigger member 13 so that the catch member 18 enters the aperture 17 of the trigger member. Then hold the parts in this relation and gradually allow the spring 9 to force the supplemental frame forward. This will cause the engaged trigger and catch members to hold together until the trigger is depressed.

The set trap may be baited or not, as desired, and it is only necessary to place it where the animal will tread upon or come in contact with the trigger plate 16. The trigger being released, the spring forcibly drives the supplemental frame forward and a leg or part of the animal's body is liable to be caught between one of the coöperating pairs of cross-bars.

The trap of the present invention is very effective in catching and holding the smaller game and fur-bearing animals as well as the larger, as it may obviously be made in various sizes. It is easily set in operable condition and may be conveniently placed in a runway, depression or other desirable place about the haunts of the animals to be trapped, and it may be concealed by brush or otherwise according to the customary practice of trappers. Furthermore, the multiple spaces and engaging members make it more effective and certain in result.

Obviously, the structure admits of considerable modification without in the least departing from the spirit of the invention. Therefore, it is not limited to that shown in the drawing.

What is claimed is:

1. In an animal trap, a main grille frame, and a supplemental grille frame slidable thereon, the respective cross-bars of the one frame being correlated to corresponding bars of the other frame whereby to afford spaces between them in the set condition of the trap and the bars are brought together in coöperative pairs when the trap is actuated from set condition.

2. In an animal trap, a main grille frame, and a spring-pressed supplemental grille frame slidable thereon, said frames affording openings between the respective cross-bars thereof in correlated pairs in the set condition of the trap and the bars of each pair being brought together under tension of the spring of said supplemental frame as the latter is released from set condition.

3. In an animal trap, a main frame comprising side-rails and spaced cross-bars, a supplemental frame comprising side-rails and cross-bars spaced correspondingly to those of said main frame, an interposed spring acting to move the supplemental frame endwise on said main frame in one direction, and a releasable catch for holding said supplemental frame in set position on said main frame against the tension of said spring, said cross-bars of the two frames being arranged in correlated pairs, respectively, whereby to afford spaces between them in the set condition of the trap and whereby also the bars of each pair are brought together as said catch is released.

WILLIAM E. LINZ, Jr.